United States Patent
Ettl et al.

(10) Patent No.: US 8,527,322 B2
(45) Date of Patent: Sep. 3, 2013

(54) PROACTIVE DEMAND SHAPING FOR A CONFIGURABLE PRODUCT PORTFOLIO WITH UNCERTAIN DEMAND

(75) Inventors: Markus R. Ettl, Yorktown Heights, NY (US); Anshul Sheopuri, Hartsdale, NY (US); Karthik Sourirajan, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 12/614,223

(22) Filed: Nov. 6, 2009

(65) Prior Publication Data

US 2011/0112889 A1 May 12, 2011

(51) Int. Cl.
*G06Q 10/00* (2012.01)
*G06F 17/10* (2006.01)

(52) U.S. Cl.
USPC ........................................................ 705/7.31

(58) Field of Classification Search
None
See application file for complete search history.

(56) References Cited

U.S. PATENT DOCUMENTS 6,253,187 B1 * 6/2001 Fox .............................. 705/7.35
7,921,030 B1 * 4/2011 Verma et al. .................. 717/107

OTHER PUBLICATIONS

Biyalogorsky, E.; Shaping Consumer Demand through the Use of Contingent Pricing; Aug. 13, 2008; forthcoming in Operations management models with consumer-driven demand, eds.*
Cho, M.; et al.; Strategic Consumer Response to Dynamic Pricing of Perishable Products; Aug. 2008; Department of Information Systems and Operations Management; pp. 1-36.*
Sheopuri et al., New Substitution Policies for Assemble-To-Order Systems with Exogenous Inventory Control, MSOM 2009, OpenConf Conference Management System, Tuesday, Jun. 30, 2009.

* cited by examiner

*Primary Examiner* — Susanna M Meinecke Diaz
*Assistant Examiner* — Ashley Chou
(74) *Attorney, Agent, or Firm* — Scully, Scott, Murphy & Presser, P.C.; Daniel P. Morris, Esq.

(57) ABSTRACT

Proactive demand shaping of configurable products with uncertain demand computes a lower bound and an upper bound on optimal profit by considering future demand distribution of one or more products, supply outlook of one or more components and customer behavior. The upper bound and the lower bound solutions are used to generate one or more rationing heuristics. Simulation may be used to determine a rationing policy to implement in practice.

15 Claims, 4 Drawing Sheets

PROACTIVE DEMAND SHAPING FOR A CONFIGURABLE PRODUCT PORTFOLIO WITH UNCERTAIN DEMAND

FIELD OF THE INVENTION

The present application relates to proactive demand shaping for a configurable product portfolio with uncertain demand.

BACKGROUND

The dynamic nature of supply and demand processes makes it difficult to synchronize or balance the supply with the demand, for example, for companies selling products or the like to customers. One way the companies may mitigate the imbalance is to steer customers toward substitutes or alternative products that are available or offer product configurations that can be supplied more easily. The companies may thus shape the demand to help improve the day-to-day supply chain operations. As an example, when a customer contacts the sales representatives of a company in order to purchase computers, the sales representative may identify and suggest product alternatives that could be offered based on the availability and even the profitability, thereby shaping demand.

Such demand shaping, however, requires identifying viable alternatives, in order to optimally utilize the available products and meet the desired level of profitability. While there have been methods developed that help identify optimal inventory control policies, they do not focus on developing policies that deter mine the alternative products to offer for shaping demand.

BRIEF SUMMARY

A method and system for proactive demand shaping of configurable products with uncertain demand is provided. The method, in one aspect, may include computing a lower bound and an upper bound on profit by considering future demand distribution of one or more products, supply outlook of one or more components and customer behavior. The method may further include generating one or more rationing heuristics based on solutions to the lower bound and the upper bound problems. In another aspect, the method may also include simulating one or more rationing heuristics for a given scenario. The method in yet another aspect may include selecting one or more rationing heuristics to implement in practice from a list of one or more such heuristics.

A system for proactive demand shaping of configurable products with uncertain demand, in one aspect, may include a computing module operable to compute a lower bound and an upper bound on profit by considering future demand distribution of products, supply outlook of components and customer behavior. The computing module may be further operable to generate one or more rationing heuristics based on solutions to the lower bound and the upper bound problems.

Further features as well as the structure and operation of various embodiments are described in detail below with reference to the accompanying drawings. In the drawings, like reference numbers indicate identical or functionally similar elements.

DETAILED DESCRIPTION

The demand shaping of the present disclosure, in one aspect, determines one or more policies for identifying viable product alternatives that mitigate the effects of supply-demand imbalances. The identified policies may be used in a simulation module that simulates supplying those product alternatives to the customers demanding products. In one aspect, offering and selling the product alternatives determined as part of the policies may help in providing better value to the customer and also maximizing the company's profits.

Figure 1:
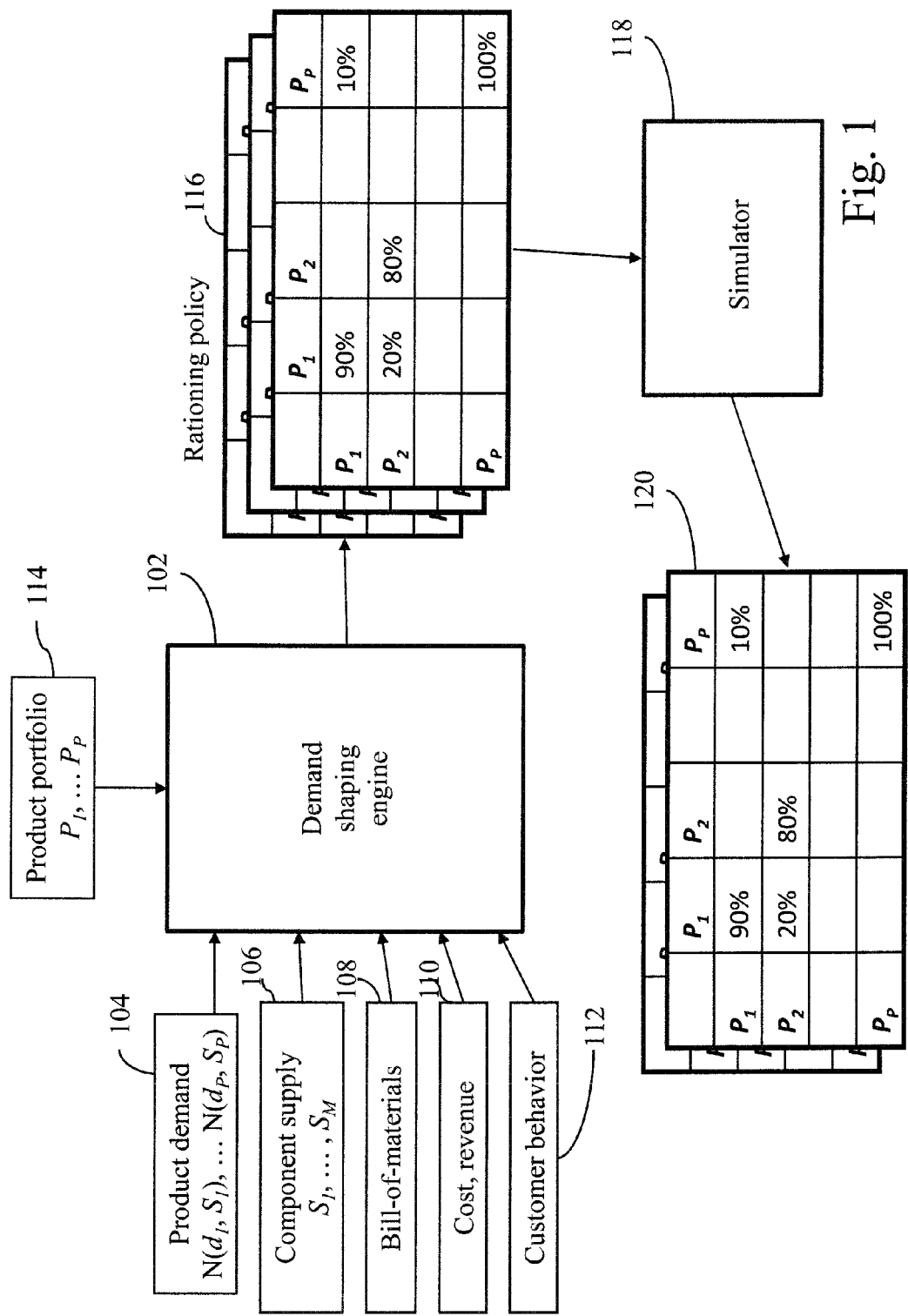
FIG. 1 is a block diagram illustrating proactive demand shaping components in one embodiment of the present disclosure.

FIG. 1 is a block diagram illustrating demand shaping components in one embodiment of the present disclosure. A proactive demand shaping module 102 (also referred to herein as an engine) uses input values such as product demand 104, component supply 106, bill-of-materials 108, cost and revenue 110, customer behavior 112, and product portfolio 114, and outputs solutions that solve objective functions. The output solutions are used to develop one or more rationing policies 116. A simulation module 118 may simulate the one or more rationing policies determined by the proactive demand shaping module 102. Based on the output of the simulation, one or more policies 120 may be selected to be implemented in practice. For example, the policy that best suits the business goal, such as those producing the highest profit or those that best mitigate the effects of supply-demand imbalances, may be selected for implementing in the real world.

The proactive demand shaping module 102 of the present disclosure may use the following algorithm to determine the policies 116. The algorithm is explained herein with reference to a class of policies for Assemble-To-Order (ATO) systems, which we refer to, herein, as rationing policies. For an Assemble-To-Order system with m products, this policy class is characterized by $m^2$ parameters, $\theta_{jk} \geq 0$ such that $\Sigma_{j=1}^{m} \theta_{jk} = 1$ for every k. For example, according to this policy, when a customer of class k arrives, product j is offered with probability $\theta_{jk}$. Since the optimal policy within the class of rationing policies is difficult to characterize, we develop two optimization models that provide upper and lower bounds on the optimal profit of the Assemble-To-Order system.

In one embodiment of the present disclosure, the lower bound is formulated as a stochastic non-linear program, which we determine to be concave, and the upper bound is formulated as a stochastic linear program. The optimal solutions of the upper and lower bound models are used as parameters for the rationing policies. The bounds are also useful to benchmark the performance of the heuristics. Numerical results indicate that the rationing policies are complementary over the range of problem parameters. Consequently, better of the two policies may be selected, for instance, to gain benefits in profit. The rationing policy developed based on the lower bound solution performs better than that developed based on the upper bound solution when the available component supply increases, revenue differences across products are low to moderate, supply imbalances towards high end components are high and when the demand variability is low to moderate and vice versa. Numerical results also indicate that the rationing policies also provide good performance compared to the upper bound and also provide improvements over the situation where we do not use product substitution.

In one embodiment of the present disclosure, consider a periodically reviewed assemble-to-order system with M components and P products. Unmet demands are backordered. We use 1, 2, ..., M to refer to the components and 1, 2, ..., P to refer to the products. We use i to denote a generic component and j and k to denote a generic product. Let the matrix, v be the bill-of-materials, i.e., ∀i,j, $v_{i,j}=1$ if component i is used to produce product j and $v_{i,j}=0$ otherwise.

The incurred costs and the generated revenues may be computed as follows. Let $r_j$ be the revenue obtained by selling product j. Let $h_i$ and $b_j$ be the holding and backordering cost parameters for component i and product j respectively. In this example, there are no holding costs associated with product j as no products are stocked. We will use $H_j$ to denote the virtual holding cost of product j, i.e., $H_j = \sum_{i=1}^{M} h_i v_{ij}$.

In one embodiment of the present disclosure, the algorithm assumes that all inventory control is exogenous during the horizon (i.e., period of time). The initial inventory for component i is $y_i$. There are no replenishment epochs during the horizon. Let $A_j$ be the set of products that may be used as substitutes for product j. We refer to a customer whose first preference is product j as a class j customer. Let $D_j$ be the demand of product j, i.e., the number of the class j customers. We use $d_j$ to denote a sample path of demands for the $j^{th}$ product. Let $\phi(.)$ be the joint probability distribution function of $D_1, D_2, \ldots, D_m$. We do not make assumptions on the correlation of the demands of different products.

We use ATO to denote the Assemble-To-Order system and C*(ATO) to denote the optimal profit of running ATO. When a customer of class j arrives, the manager of ATO decides what product to offer. We define a policy $\theta(=\{\theta_{11}, \ldots \theta_{PP}\})$ to be a decision rule that determines the product offered at every epoch that a customer arrives, given the state of the system and customer class.

For deriving the first policy of the two policies within the class of rationing policies, we construct an Assemble-To-Stock system where the products are assembled (and thus, the product quantities decided) at the beginning of the horizon before demand is realized. We denote this system as ATL. In ATL, the components are allocated to demand before it is realized. ATL models expected profit from demand shaping. It is characterized by stochastic non-linear programming in one embodiment. ATL also models demand variability and uses customer behavior patterns or models to determine potential substitutions.

For deriving the second policy, we construct an Assemble-To-Order system where the allocation of components to products is decided after all the demand is realized. We denote this system as ATU. In ATU, the components are allocated to demand after it is realized. ATU models expected profit from demand shaping characterized by stochastic linear programming, and models demand variability. This system also uses customer behavior patterns or models to determine potential substitutions.

We now describe the ATL system. In one embodiment, we formulate the optimal substitution rule for the ATL system as a non-linear optimization program with linear constraints. In order to formulate the program, we introduce some additional notation. Let $x_{jk}$ be the number of units of product j that are reserved for product k demand. Let $\pi_{jk}$ be the fraction of product k demand satisfied by product j. Thus, the problem of determining the optimal substitution rule for ATL may be written as $$Z_l^* = \max_{x,\pi} Z = \quad (1)$$

$$E\left[\sum_{j=1}^{P} r_j \sum_{k=1}^{P} \min\{x_{jk}, \pi_{jk} \cdot D_k\} - \sum_{k=1}^{P} b_k \sum_{j=1}^{P} (\pi_{jk} \cdot D_k - x_{jk})^+ - \sum_{i=1}^{M} h_i \cdot \left(y_i - \sum_{j=i}^{P} \sum_{k=1}^{P} v_{ij} x_{jk}\right) - \sum_{j=1}^{P} H_j \sum_{k=1}^{P} (\pi_{jk} \cdot D_k - x_{jk})^-\right]$$

$$\text{Subject to } \sum_{j=i}^{P} \sum_{k=1}^{P} v_{ij} x_{jk} \leq y_i, \forall i \quad (2)$$

$$\sum_{j=1}^{P} \pi_{jk} = 1, \forall k \quad (3)$$

$$\pi_{jk} = x_{jk} = 0, \forall k \notin A_j \quad (4)$$

$$\pi_{jk}, x_{jk} \geq 0, \forall j, k \quad (5)$$

The objective function given in (1) models the expected profit of the system and has four components: the revenue from selling products $$\left(\sum_{j=1}^{P} r_j \sum_{k=1}^{P} \min\{x_{jk}, \pi_{jk} \cdot D_k\}\right),$$

the penalty due to backorders $$\left(\sum_{k=1}^{P} b_k \sum_{j=1}^{P} (\pi_{jk} \cdot D_k - x_{jk})^+\right)$$

and two penalties due to excess components (one at the component level $$\left(\sum_{i=1}^{M} h_i \cdot \left(y_i - \sum_{j=i}^{P} \sum_{k=1}^{P} v_{ij} x_{jk}\right)\right)$$

and the other at the product level $$\left(\sum_{j=1}^{P} H_j \sum_{k=1}^{P} (\pi_{jk} \cdot D_k - x_{jk})^-\right).$$

Constraints (2) capture the restrictions due to available supply of components, constraints (3) capture the demand allocation requirement, constraints (4) capture restrictions on substitutability of products, and constraints (5) capture the non-negativity requirements.

Solving the above ATL non-linear optimization problem finds $x_{jk}, \pi_{jk}$ that maximizes the expected profit for the assemble-to-stock system. We postulate that the optimal profit of the assemble-to-order system C*(ATO) is bounded below by the optimal profit of ATL $Z_l^*$, i.e., $C^*(ATO) \geq Z_l^*$. That is, assemble to order optimal profit is equal to or better than the optimal profit of assemble-to-stock system.

We next describe the formulation of the ATU system in one embodiment. Suppose we have N (n=1, . . . , N) possible realizations of customer demand d (={$d_1, \ldots, d_P$}), each with a probability of $\phi(n)$ such that $$\sum_{n=1}^{N} \phi(n) = 1.$$

Let $w_{jk}^{(n)}$ be the number of units of product j used to satisfy product k demand for the $n^{th}$ realization of demand. Let $A_j$ be the set of products for which product j can be used as a substitute. Given the demands, $d_1^{(n)}, \ldots, d_P^{(n)}$, for each product k=1, . . . , P and each demand realization n=1, . . . , N, the optimal substitution rule of the ATU system may be formulated as a linear program in one embodiment.

$$Z_u^* = \max_w \sum_{n=1}^{N} \phi(n) \left[ \sum_{j=1}^{P} r_j \cdot \sum_{k=1}^{P} w_{jk}^{(n)} - \sum_{k=1}^{P} b_k \cdot \left( d_k^{(n)} - \sum_{j=1}^{P} w_{jk}^{(n)} \right) - \sum_{i=1}^{M} h_i \cdot \left( y_i - \sum_{j=1}^{P} v_{ij} \sum_{k=1}^{P} \cdot w_{jk}^{(n)} \right) \right] \quad (6)$$

Subject to $\sum_{j=1}^{P} w_{jk}^{(n)} \leq w_k^{(n)}, \forall k, n$ (7)

$$\sum_{j=1}^{P} v_{ij} \sum_{k=1}^{P} \cdot w_{jk}^{(n)} \leq y_i, \forall n, i \quad (8)$$

$w_{jk}^{(n)} = 0, \forall n, k \notin A_j$ (9)

$w_{jk}^{(n)} \geq 0, \forall n, j, k$ (10)

The objective function given in (6) maximizes the profit and comprises three components: revenue generated by selling products $$\left( \sum_{n=1}^{N} \phi(n) \left( \sum_{j=1}^{P} r_j \cdot \sum_{k=1}^{P} w_{jk}^{(n)} \right) \right),$$

backorder penalties for not satisfying demand and excess components $$\left( \sum_{n=1}^{N} \phi(n) \left[ \sum_{k=1}^{P} b_k \cdot \left( d_k^{(n)} - \sum_{j=1}^{P} w_{jk}^{(n)} \right) \right] \right),$$

inventory holding costs $$\left( \sum_{n=1}^{N} \phi(n) \left[ \sum_{i=1}^{M} h_i \cdot \left( y_i - \sum_{j=1}^{P} v_{ij} \sum_{k=1}^{P} \cdot w_{jk}^{(n)} \right) \right] \right).$$

Constraints (7) capture restriction on demand allocation, constraints (8) capture supply restrictions, constraints (9) capture restrictions on substitutions and constraints (10) capture non-negativity constraints.

We postulate that the optimal profit of the assemble-to-order system, $C^*(ATO)$ is bounded above by the optimal profit of ATU, i.e., $C^*(ATO) \leq Z_u^*$. Here, the optimal profit of ATU is expressed in terms of the probability density function. Let $$\overline{w}_{jk} = \sum_{n=1}^{N} \phi(n) w_{jk}^{(n)}.$$

Based on the optimal solutions of ATL and ATU, we suggest two heuristic policies, i.e., $\theta_{jk} = \pi_{jk}$ (we denote this heuristic as RL) and $$\theta_{jk} = \frac{\overline{w}_{jk}}{\sum_{k=1}^{m} \overline{w}_{jk}}$$

(we denote this heuristic as RU) respectively.

As described above, the upper and lower bound solutions may be used to develop rationing policies. For example, $\theta_{jk}$ of the upper or lower bound systems may correspond to the policy 116 shown in FIG. 1, for example, for j and k equal to 1 to P. The different rationing policies, e.g., $\theta_{jk}$, may be used in simulation to determine a rationing policy for implementing in real world practice.

Figure 2:
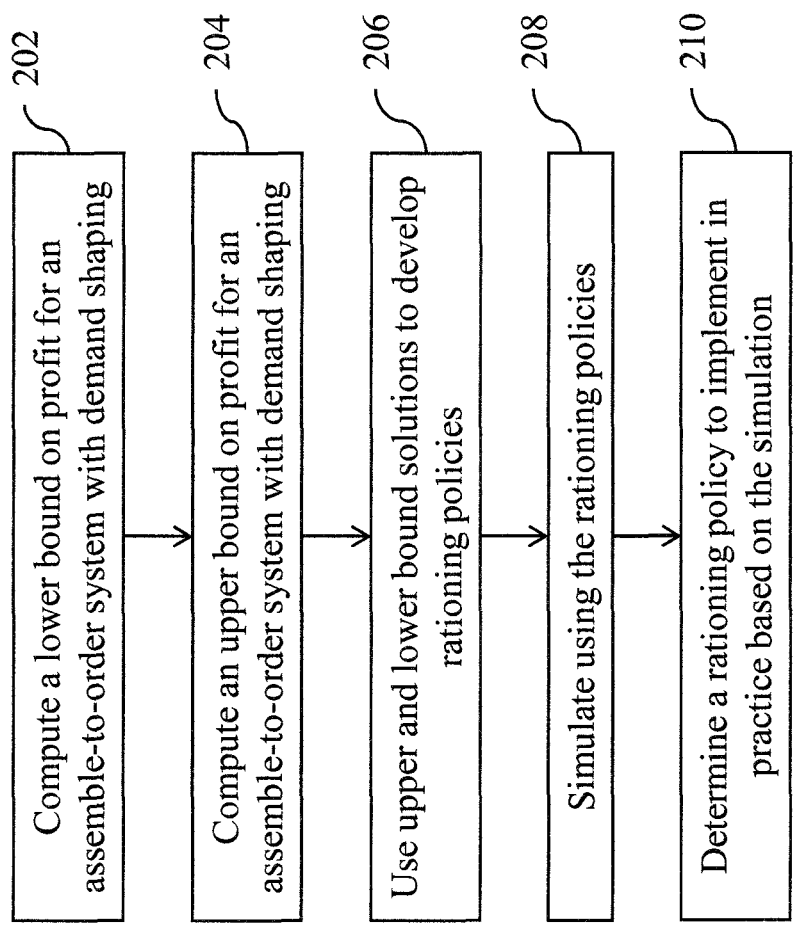
FIG. 2 is a flow diagram illustrating a method of shaping demand in one embodiment of the present disclosure.

FIG. 2 is a flow diagram illustrating a method of shaping demand in one embodiment of the present disclosure. At 202, using input values such as product demand, component supply, bill-of-material, cost, revenue, customer behavior, and product portfolio, lower bound on optimal profit for an ATO system with demand shaping is computed. The lower bound is computed with a lower bound model and/or an objective function derived by modeling an assemble-to-stock system in which the products assembled (and thus, the product quantities decided) before the demand is realized. At 204, the upper bound is computed on the optimal profit for an ATO system with demand shaping. The upper bound is computed with an upper bound objective function that constructs ATO system where the allocation of components to products is decided after all the demand is realized.

At 206, the solutions from the upper bound and lower bound objective functions are used to develop rationing policies. For example, consider a two-product, three-component system. Suppose the optimal solution to the lower bound is such that $\pi=0.8, \pi=0.2, \pi=0.6, \pi=0.4$. Using heuristic RL, we would have $\theta_{11}=0.8, \theta_{21}=0.2, \theta_{12}=0.6, \theta_{22}=0.4$ as the heuristic policy. So, when customers demand product 1, we would offer product 1 80% of the time and product 2 20% of the time. Similarly, when customers demand product 2, we would offer product 1 60% of the time and product 2 40% of the time. For the same two-product, three-component system, suppose the optimal solution to the upper bound model is such that $\overline{w}_{11}=55, \overline{w}_{21}=45, \overline{w}_{12}=30, \overline{w}_{22}=70$. Using heuristic RU, we would have $\theta_{11}=0.55$, $\theta_{21}=0.45$, $\theta_{12}=0.3$, $\theta_{22}=0.7$. So, when customers demand product 1, we would offer product 1 55% of the time and product 2 45% of the time. Similarly, when customers demand product 2, we would offer product 1 30% of the time and product 2 70% of the time.

At 208, the rationing policies may be simulated using a simulator. The simulator would model the customer demand arrival and satisfaction processes based on a rationing policy. For example, if we were to use the RL heuristic from above, the simulation would model customer demand arrival and satisfaction processes for the given problem. Whenever a customer arrives, the simulation model would use the rationing heuristic result to decide what product to offer to the customer. The simulation model would record revenue generated based on customer acceptance, inventory holding costs incurred due to component inventory left over and shortage costs if demands are not satisfied. The output of the simulation may be the expected profit from the use of a rationing heuristic.

At 210, the output of the simulation may be used to determine the rationing policy or policies that best suit the desired goal. This is done, for example, by picking the policy that generates the maximum expected profit.

Figure 3:
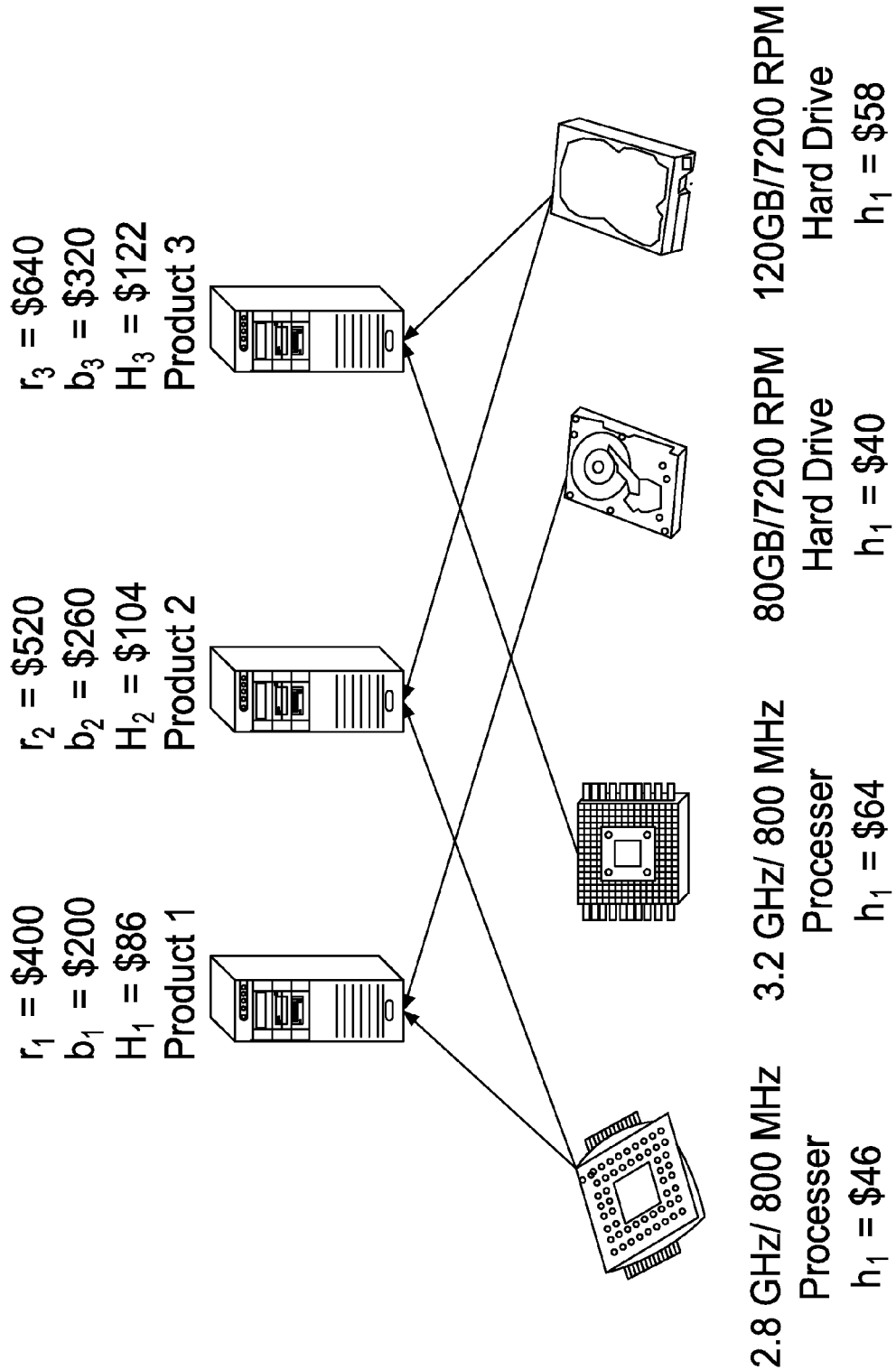
FIG. 3 illustrates example product configurations with possible alternative components, to which the algorithm of the present disclosure may be applied to determine rationing policies.

FIG. 3 illustrates example product configurations with possible alternative components, to which the algorithm of the present disclosure may be applied to determine rationing policies. In this example, we have three products and four components, unit holding costs for the components (h) and revenue (r) and shortage costs for the products (b). The bill-of-materials is represented by the arrows, with each arrow corresponding to one unit of component requirement. The potential substitutes for each product can be determined based on various predetermined rules or as user given inputs. An example of a rule may be based on the unit revenues (e.g.: we could specify that a product can be substituted for another only if the unit revenue difference is within 10%). An example of a user given input may be that product 1 and 2 can substitute each other, but product 3 cannot substitute and be substituted with any other product.

As described earlier, this input along with the available component supply and product demand distributions can be fed to the ATL and ATU models to determine RL and RU respectively. The determined RL and RU can be used in the simulator to decide which policy gives the best expected profit or meet another goal.

In one aspect, a user interface program or a web browser enabled portal may present the alternative products and/or components computed according to the above-described methodologies.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 4:
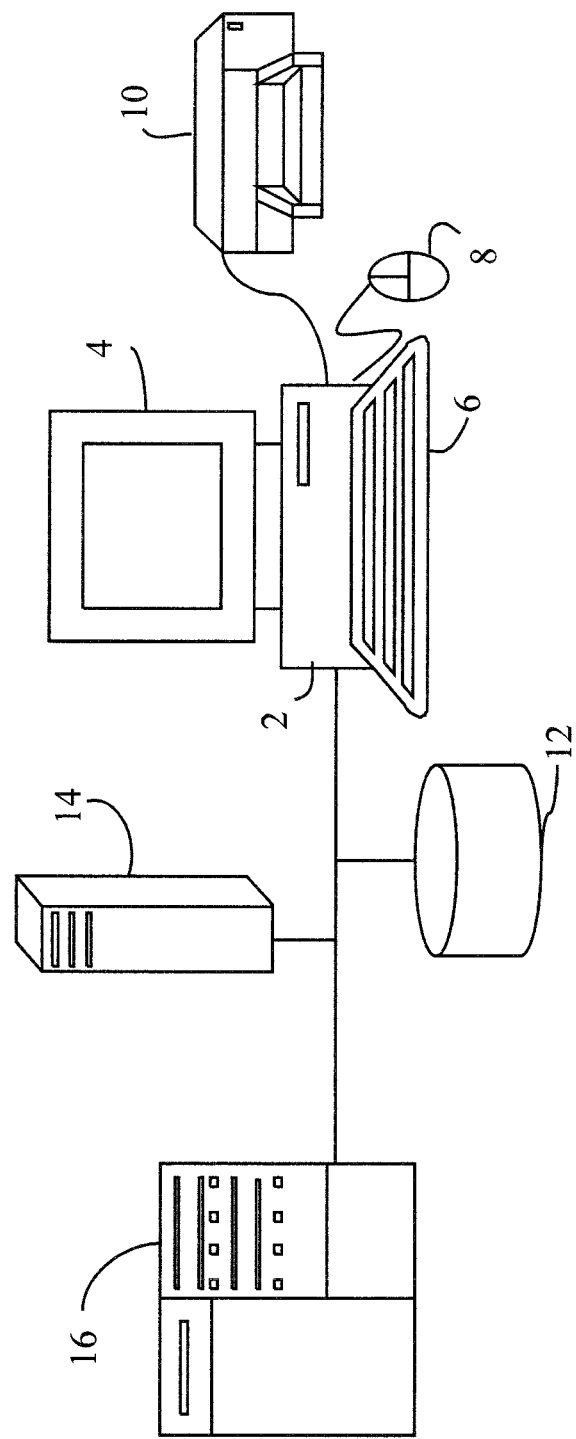
FIG. 4 illustrates an example of a computer system, in which the systems and methodologies of the present disclosure may be carried out or executed.

Referring now to FIG. 4, the systems and methodologies of the present disclosure may be carried out or executed in a computer system that includes a processing unit 2, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit 2 by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 4 for presenting output displays and providing a display through which the user may input data and interact with the processing system, for instance, in cooperation with input devices such as the keyboard 6 and mouse device 8 or pointing device. The computer processing system may be also connected or coupled to one or more peripheral devices such as the printer 10, scanner (not shown), speaker, and any other devices, directly or via remote connections. The computer processing system may be connected or coupled to one or more other processing systems such as a server 10, other remote computer processing system 14, network storage devices 12, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 2, 14, 16), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for proactive demand shaping of configurable products with uncertain demand, comprising:
    computing, using a processor, a lower bound and an upper bound on profit by considering future demand distribution of one or more products, supply outlook of one or more components and customer behavior; and
    generating one or more rationing heuristics based on one or more solutions of the lower bound and the upper bound,
    wherein computing the lower bound comprises solving a non-linear programming objective function that characterizes allocating the one or more components before demand is realized and that formulates expected profit from demand shaping and computing the upper bound comprises solving a linear programming objective function that characterizes allocating the one or more components to demand after the demand is realized and that formulates expected profit from demand shaping,
    wherein the non-linear programming objective function maximizes expected profit expressed as revenue from selling products subtracted by penalties due to back orders and excess components, subject to constraints of restriction due to available supply of components, demand allocation requirement, restriction on substitutability of products and non-negativity requirements.

2. The method of claim 1, further including:
    simulating the one or more rationing heuristics for a given scenario.

3. The method of claim 2, further including:
    selecting one or more heuristics to implement in practice from the one or more rationing heuristics based on the simulating step.

4. The method of claim 1, wherein the customer behavior is used to determine potential substitutions of one or more products.

5. The method of claim 1, wherein the linear programming objective function maximizes profit expressed as revenue generated by selling products subtracted by penalties for not satisfying demand and excess component, and inventor holding costs, subject to constraints of demand allocation, supply restriction, restriction on substitution and restriction on non-negativity.

6. A method for proactive demand shaping of configurable products with uncertain demand, comprising:
    computing, using a processor, a lower bound and an upper bound on profit by considering future demand distribution of one or more products, supply outlook of one or more components and customer behavior; and
    generating one or more rationing heuristics based on one or more solutions of the lower bound and the upper bound, wherein computing a lower bound includes solving an objective function, $$Z_l^* = \max_{x,\pi} Z =$$

$$E\left[\sum_{j=1}^{P} r_j \sum_{k=1}^{P} \min\{x_{jk}, \pi_{jk} \cdot D_k\} - \sum_{k=1}^{P} b_k \sum_{j=1}^{P} (\pi_{jk} \cdot D_k - x_{jk})^+ - \sum_{i=1}^{M} h_i \cdot \left(y_i - \sum_{j=i}^{P} \sum_{k=1}^{P} v_{ij} x_{jk}\right) - \sum_{j=1}^{P} H_j \sum_{k=1}^{P} (\pi_{jk} \cdot D_k - x_{jk})^-\right]$$

subject to $$\sum_{j=i}^{P} \sum_{k=1}^{P} v_{ij} x_{jk} \leq y_i, \quad \forall i$$

$$\sum_{j=1}^{P} \pi_{jk} = 1, \quad \forall k$$

$$\pi_{jk} = x_{jk} = 0, \quad \forall k \notin A_j$$

$$\pi_{jk}, x_{jk} \geq 0, \quad \forall j, k$$

wherein the objective function models an expected profit of a system in which the one or more components are allocated before demand is realized, and $$\sum_{j=1}^{P} r_j \sum_{k=1}^{P} \min\{x_{jk}, \pi_{jk} \cdot D_k\}$$

represents revenue from selling products, $$\sum_{k=1}^{P} b_k \sum_{j=1}^{P} (\pi_{jk} \cdot D_k - x_{jk})^+$$

represents penalty due to backorders, and $$-\sum_{i=1}^{M} h_i \cdot \left(y_i - \sum_{j=i}^{P} \sum_{k=1}^{P} v_{ij} x_{jk}\right) - \sum_{j=1}^{P} H_j \sum_{k=1}^{P} (\pi_{jk} \cdot D_k - x_{jk})^-]$$

represent penalties due to excess components, $$\sum_{j=i}^{P} \sum_{k=1}^{P} v_{ij} x_{jk} \leq y_i,$$

$\forall i$ represents constraints of restrictions due to available supply of components, $$\sum_{j=1}^{P} \pi_{jk} = 1, \quad \forall k$$

represents constraints of demand allocation requirement,
    $\pi_{jk}=x_{jk}=0$, $\forall k \in A_j$ represents constraints of restrictions on substitutability of products, and
    $\pi_{jk}, x_{jk} \geq 0$, $\forall j, k$ represents constraints of non-negativity requirements.

7. A method for proactive demand shaping of configurable products with uncertain demand, comprising:

computing, using a processor, a lower bound and an upper bound on profit by considering future demand distribution of one or more products, supply outlook of one or more components and customer behavior; and generating one or more rationing heuristics based on one or more solutions of the lower bound and the upper bound, wherein computing an upper bound includes solving an objective function, $$Z_u^* = \max_w \sum_{n=1}^{N} \phi(n) \left[ \sum_{j=1}^{P} r_j \cdot \sum_{k=1}^{P} w_{jk}^{(n)} - \sum_{k=1}^{P} b_k \cdot \left( d_k^{(n)} - \sum_{j=1}^{P} w_{jk}^{(n)} \right) - \sum_{i=1}^{M} h_i \cdot \left( y_i - \sum_{j=1}^{P} v_{ij} \sum_{k=1}^{P} w_{jk}^{(n)} \right) \right]$$

subject to $$\sum_{j=1}^{P} w_{jk}^{(n)} \leq w_k^{(n)}, \quad \forall k, n$$

$$\sum_{j=1}^{P} v_{ij} \sum_{k=1}^{P} \cdot w_{jk}^{(n)} \leq y_i, \quad \forall n, i$$

$$w_{jk}^{(n)} = 0, \quad \forall n, k \notin A_j$$

$$w_{jk}^{(n)} \geq 0, \quad \forall n, j, k$$

wherein the objective function maximizes profit, and $$\sum_{n=1}^{N} \phi(n) \left( \sum_{j=1}^{P} r_j \cdot \sum_{k=1}^{P} w_{jk}^{(n)} \right)$$

represents revenue generated by selling products, $$\sum_{n=1}^{N} \phi(n) \left[ \sum_{k=1}^{P} b_k \cdot \left( d_k^{(n)} - \sum_{j=1}^{P} w_{jk}^{(n)} \right) \right]$$

represents backorder penalties for not satisfying demand excess component, $$\sum_{n=1}^{N} \phi(n) \left[ \sum_{i=1}^{M} h_i \cdot \left( y_i - \sum_{j=1}^{P} v_{ij} \sum_{k=1}^{P} \cdot w_{jk}^{(n)} \right) \right]$$

represents inventory holding costs, and $$\sum_{j=1}^{P} w_{jk}^{(n)} \leq w_k^{(n)},$$

$\forall k,n$ represents constraints of demand allocation, $$\sum_{j=1}^{P} v_{ij} \sum_{k=1}^{P} \cdot w_{jk}^{(n)} \leq y_i,$$

$\forall n,i$ represents constraints of supply restrictions, $w_{jk}^{(n)}=0$, $\forall n$, $k \in A_j$ represents constraints of restrictions on substitutions, and $w_{jk}^{(n)} \geq 0$, $\forall n$, j, k represents constraints of non-negativity constraints.

8. A system for proactive demand shaping of configurable products with uncertain demand, comprising:

a processor; and a computing module operable to execute on the processor, and further operable to compute a lower bound and an upper bound on a profit by considering future demand distribution of products, supply outlook of components and customer behavior, the computing module further operable to generate one or more rationing heuristics based on one or more solutions of the lower bound and the upper bound, wherein the lower bound is computed by solving a non-linear programming objective function that characterizes allocating the one or more components before demand is realized and that formulates expected profit from demand shaping and the upper bound is computed by solving a linear programming objective function that characterizes allocating the one or more components to demand after the demand is realized and that formulates expected profit from demand shaping, wherein the non-linear programming objective function maximizes expected profit expressed as revenue from selling products subtracted by penalties due to back orders and excess components, subject to constraints of restriction due to available supply of components, demand allocation requirement, restriction on substitutability of products and non-negativity requirements.

9. The system of claim 8, further including:

a simulation module operable to simulate the one or more rationing heuristics for a given scenario.

10. The system of claim 8, wherein the computing module is further operable to select one or more heuristics to implement in practice from the one or more rationing heuristics based on the simulating.

11. A system for proactive demand shaping of configurable products with uncertain demand, comprising:

a processor; and a computing module operable to execute on the processor, and further operable to compute a lower bound and an upper bound on a profit by considering future demand distribution of products, supply outlook of components and customer behavior, the computing module further operable to generate one or more rationing heuristics based on one or more solutions of the lower bound and the upper bound, wherein the lower bound is computed by solving a non-linear programming objective function that characterizes allocating the one or more components before demand is realized and that formulates expected profit from demand shaping and the upper bound is computed by solving a linear programming objective function that characterizes allocating the one or more components to demand after the demand is realized and that formulates expected profit from demand shaping, wherein the linear programming objective function maximizes profit expressed as revenue generated by selling products subtracted by penalties for not satisfying demand and excess component, and inventor holding costs, subject to constraints of demand allocation, supply restriction, restriction on substitution and restriction on non-negativity.

12. A computer readable storage medium storing a program of instructions executable by a machine to perform a method of proactive demand shaping of configurable products with uncertain demand, comprising:

computing, using a processor, a lower bound and an upper bound on optimal profit by considering future demand distribution of one or more products, supply outlook of one or more components and customer behavior; and generating one or more rationing heuristics based on one or more solutions of the lower bound and the upper bound, wherein computing the lower bound comprises solving a non-linear programming objective function that characterizes allocating the one or more components before demand is realized and that formulates expected profit from demand shaping and computing the upper bound comprises solving a linear programming objective function that characterizes allocating the one or more components to demand after the demand is realized and that formulates expected profit from demand shaping, wherein the linear programming objective function maximizes profit expressed as revenue generated by selling products subtracted by penalties for not satisfying demand and excess component, and inventor holding costs, subject to constraints of demand allocation, supply restriction, restriction on substitution and restriction on non-negativity.

13. The computer readable storage medium of claim 12, further including:

simulating the one or more rationing heuristics for a given scenario.

14. The computer readable storage medium of claim 13, further including:

selecting one or more heuristics to implement in practice from the one or more rationing heuristics based on the simulating step.

15. The computer readable storage medium of claim 12, wherein the non-linear programming objective function maximizes expected profit expressed as revenue from selling products subtracted by penalties due to back orders and excess components, subject to constraints of restriction due to available supply of components, demand allocation requirement, restriction on substitutability of products and non-negativity requirements.

* * * * *